United States Patent [19]

Roffael et al.

[11] Patent Number: 5,705,542
[45] Date of Patent: Jan. 6, 1998

[54] WASTE LIQUOR DERIVED FROM CHEMICAL THERMAL PULPING OF PARTICLE BOARDS AND FIBREBOARDS CONTAINING BONDING AGENTS

[75] Inventors: Edmone Roffael, Baunschweig; Brigitte Dix, Brunswick, both of Germany

[73] Assignee: Fraunhofer-Gesellschaft zur Forderung der angewadten, Munich, Germany

[21] Appl. No.: 319,645

[22] Filed: Oct. 7, 1994

[30] Foreign Application Priority Data

Oct. 8, 1993 [DE] Germany ............ 43 34 422.4

[51] Int. Cl.$^6$ ............ C08L 97/00; C08L 87/00; C08L 3/02; C08L 3/06
[52] U.S. Cl. ............ 524/74; 524/17; 524/34; 524/47; 524/51; 524/72; 524/73; 524/733; 524/735; 524/799; 530/502
[58] Field of Search ............ 524/17, 34, 47, 524/51, 72, 73, 74, 33, 735, 799; 537/502

[56] References Cited

U.S. PATENT DOCUMENTS

| | | | |
|---|---|---|---|
| 3,864,291 | 2/1975 | Enquist | 524/799 |
| 3,907,728 | 9/1975 | Lambuth et al. | 524/34 |
| 3,909,470 | 9/1975 | Lambuth et al. | 524/34 |
| 3,990,928 | 11/1976 | Schmidt-Hellerau et al. | 524/14 |
| 3,994,850 | 11/1976 | Willeger et al. | 524/799 |
| 4,244,846 | 1/1981 | Edler | 524/15 |
| 4,279,788 | 7/1981 | Lambuth | 524/72 |
| 4,292,216 | 9/1981 | Grunewald et al. | 524/74 |
| 4,324,747 | 4/1982 | Sudan et al. | 524/74 |
| 4,344,798 | 8/1982 | Gaul et al. | 524/729 |
| 4,359,507 | 11/1982 | Gaul et al. | 524/73 |
| 4,361,662 | 11/1982 | Gaul et al. | 524/72 |
| 4,413,112 | 11/1983 | Reiff et al. | 524/591 |
| 4,414,361 | 11/1983 | Saul et al. | 524/735 |
| 4,472,550 | 9/1984 | Reiff et al. | 524/107 |
| 4,528,153 | 7/1985 | Scholl et al. | 524/745 |
| 4,537,941 | 8/1985 | Kambanis et al. | 524/735 |
| 4,608,407 | 8/1986 | Kerimis et al. | 524/14 |
| 4,801,631 | 1/1989 | Sachs et al. | 524/72 |

FOREIGN PATENT DOCUMENTS

| | | |
|---|---|---|
| 530352 | 7/1983 | Australia. |
| 0056935 | 8/1982 | European Pat. Off. . |

OTHER PUBLICATIONS

Von R. Marutzky, Moglichkeiten der Entsorgung und Verwertung von Altmobeln, 1993 (English translation of paragraph 1.).

Von R. Marutzky, Moglichkeiten der Entsorgung und Verwertung von Altmobeln, 1993.

N. Parameswaran und E. Roffael, Kenntnisstand und Untersuchungsergebnisse zur Wirkung von Ammoniak auf Holzspane*, Springer–Verlag, 1984, including English abstract.

E. Roffael and B. Dix, Lignin and ligninsulfonate in non–conventional bonding—an overview*, Springer–Verlag 1991, including English abstract.

Lignin, Band 16, pp. 253–259 (Undated).

*Primary Examiner*—Peter A. Szekely
*Attorney, Agent, or Firm*—McDermott, Will & Emery

[57] ABSTRACT

The invention concerns the waste liquor from the chemical-thermal pulping of fibre boards and particle boards containing bonding agents. The waste liquor is produced through a procedure in which fibre boards and wood particle boards are first chopped into shreds and, in a subsequent step, pulped according to a chemical-thermal procedure which dissolves the wood structure. The liquid remaining after the separation of the cellulose is retained as waste liquor and used as extender for wood adhesives.

21 Claims, No Drawings

WASTE LIQUOR DERIVED FROM CHEMICAL THERMAL PULPING OF PARTICLE BOARDS AND FIBREBOARDS CONTAINING BONDING AGENTS

BACKGROUND OF THE INVENTION

1. Field of the Invention

The invention concerns the waste liquor from fabricated chip and/or fibre boards.

2. Description of the Related Art

In the production of wood-based panels, particularly fibre board or particle board, bonding agents, such as urea formaldehyde resins (UF resins), phenol formaldehyde resins (PF resins) and those based on polymer diisocyanate (PMDI), are usually used. These bonding agents are expensive and account for up to 30% of the final costs of the particle board production. It is important, on the one hand, to use a bonding agent which provides the fibre board and particle boards with the required stability, but, on the other hand, to hold their use to the lowest amount needed. For this reason, the bonding agents used are often extended with other, cheaper substances. Known extenders are sulphite liquors (Roffael, E., Dix, B. 1990: Lignin and ligninsulfonate in non-conventional bonding systems—an overview. 1st European Workshop on Lignocellulosics and Pulp (EWLP), Sept. 18–20, 1990, Hamburg), carbohydrates (Stofko, J. 1978: Bonding of solid lignocellulosic material. U.S. Pat. No. 4,107,379, Stofko, J. 1980: Bonding of solid lignocellulosic material. U.S. Pat. No. 4,183,997) and salt solution (Roffael, $., Schneider, A. 1983: Investigations on the influence of salt as bonding agent additive on the properties of chip board. Holz-Zentralblatt 109, 1414–1415).

SUMMARY OF THE INVENTION

It is the task of the current invention, to present an inexpensive and advantageous extender for wood material bonding agents and a procedure for its production. The procedure for the production of such an extender has to be cost effective and simple.

The problem has been solved by the invention cited in the principal claim. The procedure for the production of the extender is shown in claim 6.

It was surprisingly found that it is possible to produce extenders for bonding agents from already fabricated (old) fibre board and particle boards (e.g., from old furniture), which already contain bonding agents such as UF resins, PF resins, tannins or diiscyanates. If the fibre boards and particle boards are chemically-thermally pulped in such a manner that the wood structure is destroyed, the result of this procedure is a liquid. The wood structure is fully or partially separated into its main chemical components (lignin, hemicellulose, cellulose). The resulting liquid, called "waste liquor" in the literature, contains in this case not only the decomposition products of the wood, but also those of the bonding agent used. After concentration, such a liquor can be used immediately as bonding agent substitute. The addition of this kind of extender depends on the required stability of the finished products and on the actual composition of the bonding agent. An addition of 20% of the extender usually leads to very good results, i.e., the stability of a fibre board or particle board produced with such a bonding agent corresponds to the stability of a board produced with a pure bonding agent (without extender additive). In many cases an addition of extenders to the bonding agent at a ratio of 50:50 is possible.

DETAILED DESCRIPTION OF THE INVENTION

The procedure for the production of the extender according to the invention is such that fibre board and particle boards are chopped up into shreds and the shreds then subjected to a chemical-thermal treatment in such a manner that the wood structure is dissolved. It is possible to apply this procedure to fibre- and particle boards produced with amino plastic resins, with bonding agents on the basis of phenol plastics and with bonding agents based on PMDI. As pulping procedure it is possible, e.g., to apply the sulphite and sulphate procedure used for the production of cellulose from the wood. Thus, the procedure according to the invention can combine the production of extenders from old chip and particle boards with the production of cellulose or cellulose type products in an advantageous manner. The procedure according to the invention for the production of extenders for bonding agents has the added advantage that old fibre and particle boards can be usefully recycled, instead of having to be disposed off in a non-ecological manner by deposit in a dump or by thermal waste disposal. The thermal disposal of particle board carries the additional danger of additional formation of dioxin, and hydrochloric acid is formed when ammonium chloride had been used as hardening agent. It is obvious that the procedure can analogously be applied to the residues of the fibre board and particle boards which result from the fabrication (e.g. post formation). It is possible that the preliminary shredding can be omitted in this case.

The waste liquor according to the invention can be used as an extender for wood material bonding agents, particularly for urea formaldehyde resin, phenol formaldehyde resin, tannin formaldehyde resin, starch or pectin, starch acetate or starch propionate and protein.

Table 1 shows the properties of cellulose produced from a UF bonded fibre board and particle board, as well as the pulping conditions applied.

Table 2 shows the gel times from mixtures of "waste liquors" of the fibre board and particle boards with conventional UF resins.

It can be seen from Table 1 that it is possible to produce cellulose with acceptable stability properties using the sulphate procedure. The selection of the suitable procedure depends on the composition of the wood in the fibre board or particle board as well as on the applied bonding agent. The further application of the lignocellulose after the pulping may also be a determining factor. If the cellulose to be produced is to be applied to paper production, much stricter conditions may be selected than for its use in the production of fibre boards. The yield from the pulping of the particle board according to the sulphate procedure is within the usual range, comparable to the pulping of the wood itself. The brightness is also within the usual range for sulphate cellulose.

TABLE 1

Properties of sulphate cellulose, produced from UF bonded particle boards and MDF (medium density fiber board)

| Cellulose properties | Unit | Particle board pulping A* | Particle board pulping B* | MDF pulping B* |
|---|---|---|---|---|
| Beating time | min. | 15 | 15 | 15 |
| Beating grade | ·SR | 15 | 15 | 15 |

TABLE 1-continued

Properties of sulphate cellulose, produced from UF bonded particle boards and MDF (medium density fiber board)

| Breaking length | km | 4.44 | 5.23 | 1.06 |
|---|---|---|---|---|
| Tearing strength | mN · m | 1284 | 1292 | 489 |
| Folding strength | m | 90 | 130 | 11 |
| Bursting strength | kPa · m² | 2.47 | 2.81 | 0.24 |
| Yield | g % | 49.5 | 49.3 | 48.0 |
| Brightness | % | 15.5 | 16.0 | 8.7 |

| Pulping conditions: | Pulping A | Pulping B |
|---|---|---|
| Maximum pulping temperature: | 180° C. | 180° C. |
| Heating time to max. pulping temp. | 150 min | 150 min |
| Pulping time at max. pulping temp. | 30 min | 60 min. |
| Cooling time to 110° C. | 30 min | 30 min |
| NaOH relative to absolutely dry material | 18% | 18% |
| Na₂S relative to absolutely dry material | 4% | 4% |
| Bath ratio (shreds:liquor) | 1:5 | 1:5 |

TABLE 2

Gel times (at 90° C.) of mixtures of UF resin and "waste liquor" (sulphate pulping of particle board and MDF)

Glue mix: UF resin 1 (65%, mol ratio F:U = 1.3:1) or
UF resin 2 (65%, mol ratio F:U = 1.3:1)
Extender (5 . . . 10% substitute of UF hard resin)
15% ammonium chloride solution (10% relative to 65% raw glue)

| UF resin | Extender | Extender content (%) | Gel time (s) |
|---|---|---|---|
| 1 | — | — | 118 |
| 2 | — | — | 121 |
| 1 | "waste liquor" MDF | 5 | 198 |
|   |   | 10 | 451 |
| 2 | "waste liquor" MDF | 5 | 180 |
|   |   | 10 | 420 |
| 1 | "waste liquor" particle board | 5 | 187 |
|   |   | 10 | 315 |
| 2 | "waste liquor" particle board | 5 | 170 |
|   |   | 10 | n.d. |
| 1 | organosolv lignin | 5 | 120 |
|   |   | 10 | 143 |
| 2 | organosolv lignin | 5 | 128 |
|   |   | 10 | 129 |
| 1 | lignin sulphonate | 10 | 163 |
| 2 | lignin sulphonate | 10 | 142 | n.d. = not determined

We claim:

1. A method of extending a wood material bonding agent comprising admixing a waste liquor resulting from a chemical-thermal pulping of fabricated chip and particle boards with the wood material bonding agent.

2. A method according to claim 1, wherein the wood material bonding agent comprises a urea formaldehyde resin.

3. A method according to claim 1, wherein the wood material bonding agent comprises a phenol formaldehyde resin.

4. A method according to claim 1, wherein the wood material bonding agent comprises a tannin formaldehyde resin.

5. A method according to claim 1, wherein the wood material bonding agent comprises a starch, pectin, starch acetate or starch propionate.

6. A method according to claim 1, wherein the wood material bonding agent comprises a protein.

7. A method according to any of claims 1 to 5 and 6, wherein pH-value of the waste liquor is adjusted.

8. A method according to claim 1, wherein the fabricated chip and particle boards include a bonding agent.

9. A method according to claim 1, wherein the chemical-thermal pulping of the fabricated chip and particle boards includes a sulphate procedure.

10. A method according to claim 1, wherein the chemical-thermal pulping of the fabricated chip and wood particle boards includes a sulphite procedure.

11. A method according to claim 1, wherein the chemical-thermal pulping of the fabricated chip and wood particle boards includes an organosolv procedure.

12. A process for the production of the waste liquor used in claim 1, wherein the fabricated chip and particle boards are chopped up into shreds and the shreds are then subjected to the chemical-thermal pulping in such a manner that the wood structure is dissolved, whereby the liquid remaining after the separation of the cellulose is collected as waste liquor.

13. A method of claims 1 or 4, wherein the fabricated chip and particle boards are bonded with amino plastics.

14. A method of claims 1 or 2, wherein the fabricated chip and particle boards include a bonding agent on the basis of phenol formaldehyde resins.

15. A method of claims 1 or 2, wherein the fabricated chip and particle boards include a bonding agent on the basis of polymer disocyanate (PMDI).

16. A method of claims 1, 2, or 5, wherein pH-value of the waste liquor is adjusted to 10–12.

17. A method according to claims 1, 4 or 5, wherein pH-value of the waste liquor is adjusted to 4–5.

18. A method according to claim 1, wherein the waste liquor from UF-bonded particle- and fibreboards is used for extending a urea formaldehyde resin.

19. A method according to claim 1, wherein the waste liquor from PF-bonded particle- and fibreboards is used for extending a phenol formaldehyde resin.

20. A method according to claim 1, wherein the waste liquor from PF-bonded boards is used for extending a tannin formaldehyde resin.

21. A method according to claim 1, wherein the waste liquor from PF-bonded boards is used for extending a starch, pectin or a protein containing adhesive.

* * * * *